United States Patent
Davies et al.

(10) Patent No.: US 6,920,928 B1
(45) Date of Patent: Jul. 26, 2005

(54) METHOD FOR WATER CONTROL

(75) Inventors: Stephen N. Davies, Over (GB); Timothy G. J. Jones, Cambridge (GB); Silke Olthoff, Cambridge (GB); Gary J. Tustin, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/647,272

(22) PCT Filed: Mar. 25, 1999

(86) PCT No.: PCT/GB99/00942

§ 371 (c)(1),
(2), (4) Date: Nov. 20, 2000

(87) PCT Pub. No.: WO99/50530

PCT Pub. Date: Oct. 7, 1999

(30) Foreign Application Priority Data

Mar. 27, 1998 (GB) .............................................. 9806493

(51) Int. Cl.⁷ .............................................. E21B 33/13
(52) U.S. Cl. ......................... 166/279; 166/292; 166/295
(58) Field of Search ................................ 166/279, 285, 166/202, 293, 294, 295, 310

(56) References Cited

U.S. PATENT DOCUMENTS

| | | |
|---|---|---|
| 3,719,228 A | 3/1973 | Carcia |
| 3,923,100 A | 12/1975 | Bellos et al. |
| 3,964,923 A * | 6/1976 | Zetmeir ..................... 106/189 |
| 4,572,295 A | 2/1986 | Walley |

(Continued)

FOREIGN PATENT DOCUMENTS

GB    2 318 814 B    2/2001

OTHER PUBLICATIONS

Sydansk, R. D. and Smith, T. B. Field Testing of a New Conformance–Improvement–Treatment Chromium (III) Gel Technology SPE/DOE 17383 (1988).

Bouts, M. N., de Vries, A. S., Dalland, M., Hanssen, J. E. Design of Near Well Bore Foam Treatments for High GOR Producers SPE/DOE 35399 (1996).

Hutchins, R. D., Dovan, H. T. and Sandiford, B. B. Field Applications of High Temperature Organic Gels for Water Control SPE/DOE 35444 (1996).

(Continued)

Primary Examiner—William Neuder
(74) Attorney, Agent, or Firm—Bill Wang; Robin Nava; Brigitte L. Echols (57) ABSTRACT

A method to reduce water influx into a producing well is described comprising the steps of pumping a chemical composition into a production interval and into surrounding formation; said composition being capable of forming, firstly, a physically stabilized structure and, secondly, a chemically stabilized structure, wherein said physically stabilized structure being dissolvable by hydrocarbon containing fluids; letting said composition form said physically stabilized structure within the formation surrounding said production interval; changing pressure condition in said production interval such that the fluid flow within the surrounding formation is reversed; letting thereby in some portions of the formation hydrocarbon containing fluids dissolve said physically stabilized structure and chemically stabilize said structure in the remaining portions by a cross-linking reaction. The time constants of the two stabilizing reactions are selected such that the physical stabilization is essentially completed before the pumping direction is reversed and the chemical stabilization is essentially completed after the pump-out/cleaning operation.

8 Claims, 5 Drawing Sheets

U.S. PATENT DOCUMENTS

| | | |
|---|---|---|
| 4,623,283 A | 11/1986 | Chew |
| 4,717,132 A | 1/1988 | Yang |
| 5,067,564 A | 11/1991 | Sydansk |
| 5,082,057 A | 1/1992 | Sydansk |
| 5,105,884 A | 4/1992 | Sydansk |
| 5,146,986 A | 9/1992 | Dalrymple |
| 5,150,754 A | 9/1992 | Phelps et al. |
| 5,161,615 A * | 11/1992 | Hutchins et al. ............ 166/295 |
| 5,203,834 A | 4/1993 | Hutchins et al. |
| 5,247,993 A | 9/1993 | Sarem et al. |
| 5,465,792 A * | 11/1995 | Dawson et al. ............ 166/295 |
| 5,547,025 A | 8/1996 | Ahmed et al. |
| 6,109,350 A * | 8/2000 | Nguyen et al. ............ 166/281 |

OTHER PUBLICATIONS

Chan, K. S., Parker, A., and Desbrieres, J. Water Channeling Treatment for Improving Oil Recovery Using a Non–polymer Chemical System Proceedings of $2^{nd}$ Zulia Univ Enhanced Oil Recovery Int Symposium, vol 1, 1987, pp 621–649.

Kohler, N., Zaitoun, A., Maitin, B. K., and Truchetet, R. Selective Control for Water Production in Oil or Gas Producing Wells Proceedings of $4^{th}$ EC Symposium, Berlin 1992, Oil and Gas in a Wider Europe, pp 401–414.

Sobanova, O. B., Fridman, G. B., Arefev, Yu. N. Kandaurova, G. F., and Yunusiv, Sh. M. Use of Hydrocarbon Compositions of Surface–active Agents for Limiting Water Entry into Producing Wells Neftepromysl Delo, vol 2/3, 1995, pp 34–37.

Suleimanov, B. A. Use of Multiple–function Microemulsion for Bottom Hole Zone Treatment Neft Khoz, vol 12, 1995, pp 65–67.

Thompson, K. E. and Fogler, H. S. A Study of Diversion Mechanisms by Reactive Water Diverting Agents SPE Production and Facilities, May 1995, pp 130–137.

\* cited by examiner

METHOD FOR WATER CONTROL

The present invention relates to methods of reducing the water production of a hydrocarbon well drilled through subterranean formations. More particularly it relates to such methods for selectively reducing the flow of subterranean aqueous fluids into a well while maintaining its hydrocarbon production.

BACKGROUND OF THE INVENTION

During the life cycle of a hydrocarbon well, e.g., a well for extracting oil or natural gas from the Earth, the producing well commonly also yields water. In these instances, the amount of water produced from the well tends to increase over time with a concomitant reduction of hydrocarbon production. Frequently, the production of water becomes so profuse that remedial measures have to be taken to decrease the water/hydrocarbon production ratio. As a final consequence of the increasing water production, the well has to be abandoned.

Various techniques have been developed and used for reducing the quantity of water produced from oil and/or gas wells. Under normal circumstances, an open production interval is formed so that the well communicates with the hydrocarbon-bearing zone(s) of the formation but does not extent into and communicate with the water-bearing portion (s). However, the open production interval formed may inadvertently communicate with a water-bearing zone which is completed in the same wellbore.

Even if there is no actual initial fluid communication between the open production interval and the water-bearing zones of the formation, such communication may develop during production of hydrocarbon. For example, water may be drawn upwardly from the water-bearing portion in a process known as water coning.

To counteract the effects of water-influx and/or coning, U.S. Pat. No. 3,719,228 discloses for example a method of treating a subterranean formation containing hydrocarbons and brine to stimulate the production of hydrocarbons: A preflush composition comprised of a water solution of rosin soap and fatty acid soap is injected into the formation. The preflush reacts with connate brine to produce a precipitate that blocks the brine-bearing passages. The composition does not react with hydrocarbons thereby allowing hydrocarbon-bearing passages to remain open.

Another alternative method is disclosed in U.S. Pat. No. 4,617,132: A sandstone formation is contacted with an aqueous solution containing a water soluble anionic polymer having a molecular weight greater than 100,000. As the next step, the anionic polymer is contacted with a fluid containing a water soluble cationic polymer having a weight greater than 1,000. As a result of the contact of the anionic with the cationic polymer, coacervation occurs between the two polymers which reduces the amount of the anionic polymer removed from the formation by fluids produced therefrom. The presence of stabilized polymer in the formation reduces the water/oil ratio by reducing the permeability of the formation to water in the wellbore area.

U.S. Pat. No. 5,146,986 discloses another method of selectively reducing the permeability of a subterranean formation. The formation is contacted with a hydrocarbon carrier liquid containing a surface active agent. The surface active agent is believed to adsorb on the walls of the interstitial passages in the formation as a result of which, the flow of water through the passages is reduced.

U.S. Pat. No. 5,150,754 discloses a method of, firstly, selectively injecting into a hydrocarbon-bearing zone a petroleum mixture capable of forming a solid gel that degrades over a designated period of time. In a second step, an aqueous gel-forming mixture is injected into a water influx zone of the formation. Upon degradation of the first gel, production of hydrocarbons can continue.

Another method, disclosed in U.S. Pat. No. 5,203,834, comprises the steps of injecting a gas, a polymer composition capable to form a foamed gel with the gas, and a delayed gel degrading agent being capable of opening pathways in the gel.

Furthermore, K. E. Thomson and H. S. Fogler published in SPE Production and Facilities, May 1995, pp. 130–137, a proposal using an injection backflow and shut-in procedure, using a slow reacting silica based diverting agent. The backflow step is described as a miscible displacement of the agent before the onset or completion of the gelation.

The object of this present invention is to provide improved methods for water control.

SUMMARY OF THE INVENTION

According to the present invention there is provided a method comprising the steps of pumping a chemical composition into a production interval and into surrounding formation; said composition being capable of forming, firstly, a physically stabilized structure and, secondly, a chemically stabilized structure, wherein said physically stabilized structure being dissolvable by hydrocarbon containing fluids; letting said composition form said physically stabilized structure within the formation surrounding said production interval,; changing pressure condition in said production interval such that the fluid flow within the surrounding formation is reversed; letting thereby in some portions of the formation hydrocarbon containing fluids dissolve said physically stabilized structure and chemically stabilize said structure in the remaining portions by a cross-linking reaction.

It will be appreciated by those skilled in the art that the present invention is designed as a "bull-headed" formation treatment applied directly from the surface. No intermediate step of placing packers or otherwise isolating sections or targets zones within the production interval is required. It can be seen as being an important feature of the method that the gel-forming composition enters the formation surrounding the wellbore indiscriminately, restricted only by the permeability contrast of different portions. The present invention is preferably applied to formations where the permeability contrast between water-bearing and hydrocarbon-bearing zones of the formation is less than hundred, preferably less than ten. In formation with higher contrast conventional methods are expected to provide already satisfactory results.

Furthermore, the present invention uses an organic composition which has the property of rapidly forming a structure which is essentially stabilized by intermolecular forces known as van der Waals forces. It is important that this first structure is reversible by altering its chemical environment. A second property of the organic composition employed in the present invention is the ability to form an essentially irreversible structure. This permanent structure is formed by a chemical cross-linking reaction.

The term structure is defined within the scope of the present invention as including any cluster, gel or other association of molecules. The presence of a structure can be determined by various tests that are well known in the industry. Those test include direct measurements of the permeability of core samples, thus for example comparing the flow before after injection of the composition. Another established test method for gelling compositions is the so-called bottle test to measure the gel strength. More refined Theological measurements including measurement of viscosity, shear forces, yield stress etc. may be used. The presence of a structure can also be detected by radiation or particle beam scattering methods.

An important aspect of the present invention relates to the time delay between the formation of the physically stabilized structure and the cross-linked structure. The physically stabilized structure has to be formed before the pumping direction is reversed. For most applications this time will be less that 24 hours after injection of the composition into the formation surrounding the borehole. In practice, however, this time is reduced to less that six hours, preferably even less than one hours. Some of the compositions described below can form gels in less than 10 min after injection.

Chemical cross-linking is defined as forming a chemical bond between the cross-linked molecules. Chemical cross-linking is understood to be stable and irreversible. The cross-linking reaction can be slow or delayed. Both mechanisms can be designed such that no substantive cross-linking occurs before the pumping direction has been reversed and fluid is pumped out of the well. In absolute terms the formation of a cross-linked permanent structure should be completed within 24 hour or more after the injection. More preferably, this time should be 48 hours or even five days after injection.

By the invention various gelling compositions are employed. Preferably, these compositions comprise surfactants or polymers or a combination of both.

In a preferred variant of the invention, the surfactants are selected from a class of surfactants known in the art as viscoelastic surfactants (VES). In a variant of this embodiment, a delaying agent is added to the viscoelastic surfactants so as to delay the gelation of the composition. The structure or gel formed by the viscoelastic surfactants can be strengthened by adding a polymerization agent to the composition. The polymerization agent initiates a, preferably in situ, polymerization of the VES. In a further step, the strength of the structure or gel is enhanced through a cross-linking agent that links the polymerized viscoelastic surfactants.

In a second preferred variant of the invention, the structure-forming composition comprises hydrophobically modified water-soluble polymers.

The polymers preferably comprise low concentrations (0.5–5 mole percent) of hydrophobic monomers which co-polymerize with the hydrophilic monomers to form random or block copolymers. In a first preferred embodiment, the hydrophilic part of the polymer, being preferably 95–99.5 mole percent of the polymer chain, contains at least some small fraction of monomeric groups which can be chemically cross-linked to produce a gel. Alternatively, the hydrophobic groups themselves can contain chemical functions which can be the sites of cross-linking.

Some of the advantages in the use of hydrophobically modified polymers are responsiveness to hydrocarbons resulting in a reduction in the adhesive strength of structure or gels and an extreme retardation of gelation, and solubilisation of large organic cross-linking agents.

The cross-linking agents can be either inorganic ions (or ionic complexes) or polar organic molecules. When the polymer contains ionic groups such as carboxylate or sulphonate functions the polymer chains can be cross-linked by inorganic ions such as chromium(III) or zirconium(IV), frequently in the presence of monomeric ligands, such as acetate or adipate ions, to control the rate of cross-linking. Alternatively, organic cross-linking agents can be used. For example, the amide groups on poly(acrylamide) can be cross-linked with formaldehyde or a mixture of formaldehyde and phenol. The disadvantages of using formaldehyde or similar small molecules are their toxicity and issues of disposal. The larger reagents such as hexanal and heptanal which are not classed as toxic would be suitable cross-linking agents but are not sufficiently soluble in water to cross-link normal hydrophilic polymers such as the poly(acrylamide)/poly(acrylate) copolymer. However, these larger cross-linking agents are readily solubilized in aqueous solutions by hydrophobically-modified poly(acrylamide) polymers and can thence cross-link them.

An alternative class of polymers employed by the present invention are self cross-linking polymers. The self cross-linking reaction is preferably a poly-condensation initiated by an appropriately controlled pH value.

In a third preferred variant of the present invention, the gel-forming composition comprises a combination of viscoelastic surfactants and polymers. Even more preferably, the composition of comprises VES with a gel-delaying and polymers capable of cross-linking in the presence of or without an additional cross-linking agent.

The advantage of the above described variants of the invention is that the gel strength development over time of the compositions can be controlled such that during an injection phase the viscosity of the composition is low. After injection, i.e., after the shear forces cease, the composition will develop rapidly an intermediate gel strength based on physical interactions between molecules of the compositions. Where in contact with hydrocarbons the gel destabilizes and can be washed out during subsequent production. The remaining gel is strengthened by a chemical cross-linking of irreversible nature and, hence, can block water-bearing zones permanently.

Even though the compositions described above are particularly suitable for water control operations in a producing well, the present invention contemplates use of those compositions in other operations related to the development, completion, and production of natural hydrocarbon reservoirs, currently performed with conventional polymer or VES based systems. These operations include fracturing subterranean formations, modifying the permeability of subterranean formations, or sand control. Other uses may comprises the placement of a chemical plug to isolate zones or complement an isolating operations.

These and other features of the invention, preferred embodiments and variants thereof, and further advantages of the invention will become appreciated and understood by those skilled in the art from the detailed description and drawings following below.

MODE(S) FOR CARRYING OUT THE INVENTION

The process is described in more detail for the case of water entry through one or more zones in a multi-layered completion where the remaining layers are producing water-free oil as illustrated in FIG. 1.

Figure 1A:
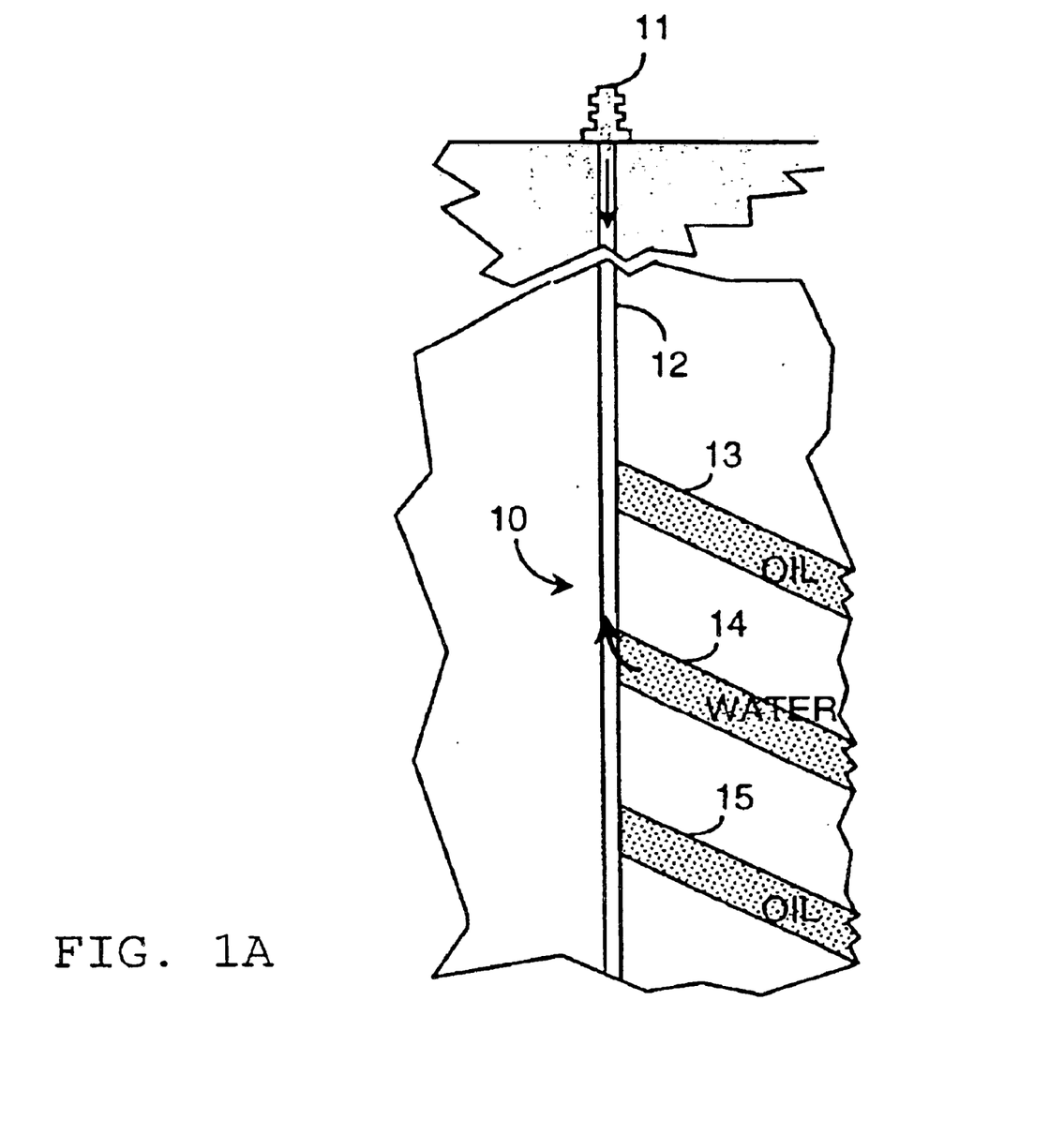
FIGS. 1A–D illustrates significant steps of a water control operation in accordance with the present invention.
Figure 1B:
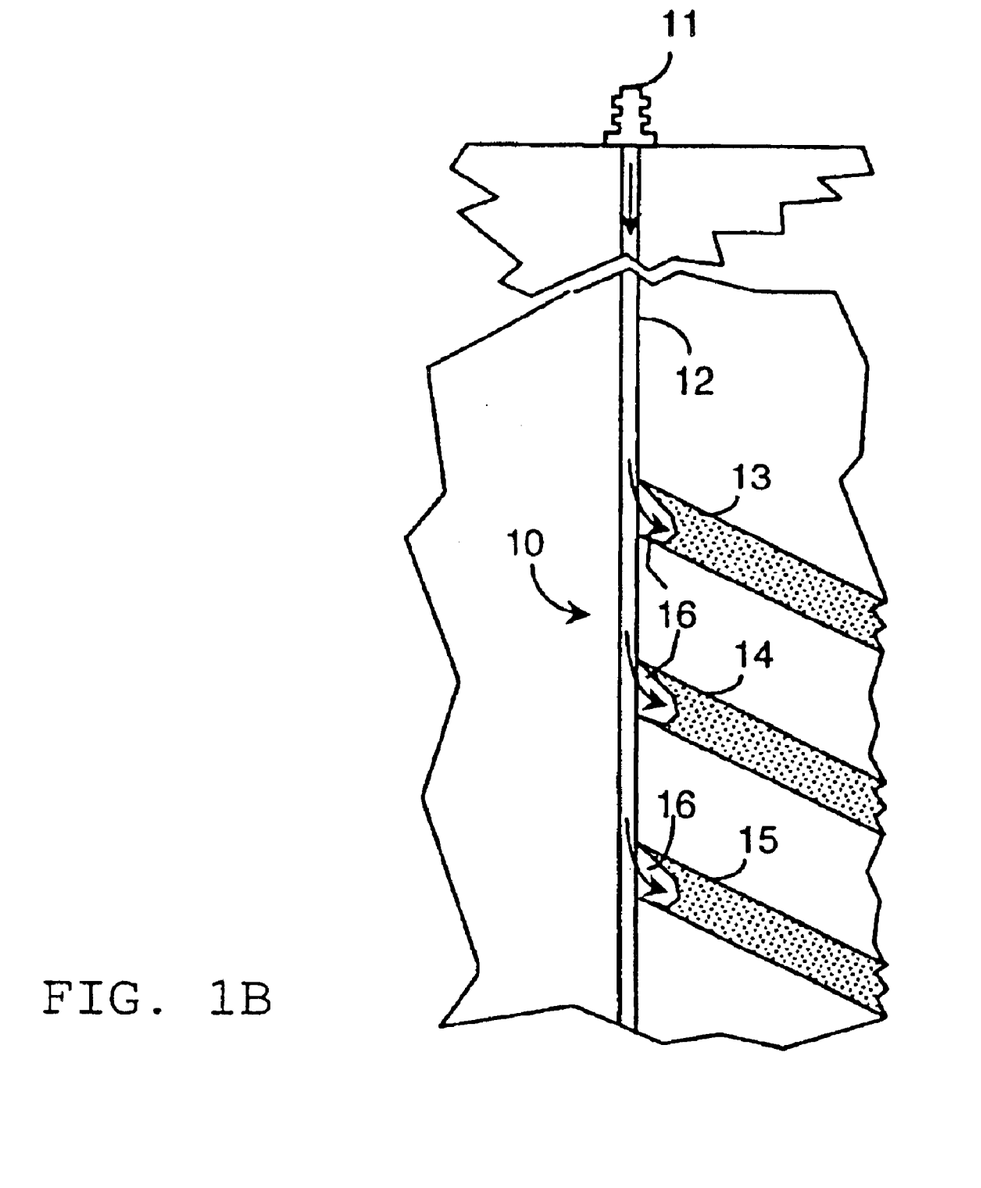

The first schematic drawing (FIG. 1A) shows a producing well 10 including wellhead 11 and wellbore 12. It is assumed that three permeable layers 13, 14, 15 have been completed with a water breakthrough in layer 14. The treatment fluid 16 is pumped from surface without mechanical isolation (packers) and invades all open zones (FIG. 1B). The treatment fluid provides a reversible, oil-sensitive structure in each layer. Such structures can be formed using compositions consisting of surfactants or hydrophobically modified polymers or mixtures thereof in combination with an agent controlling the association of the species in solution as are described in more detail below.

Figure 1C:
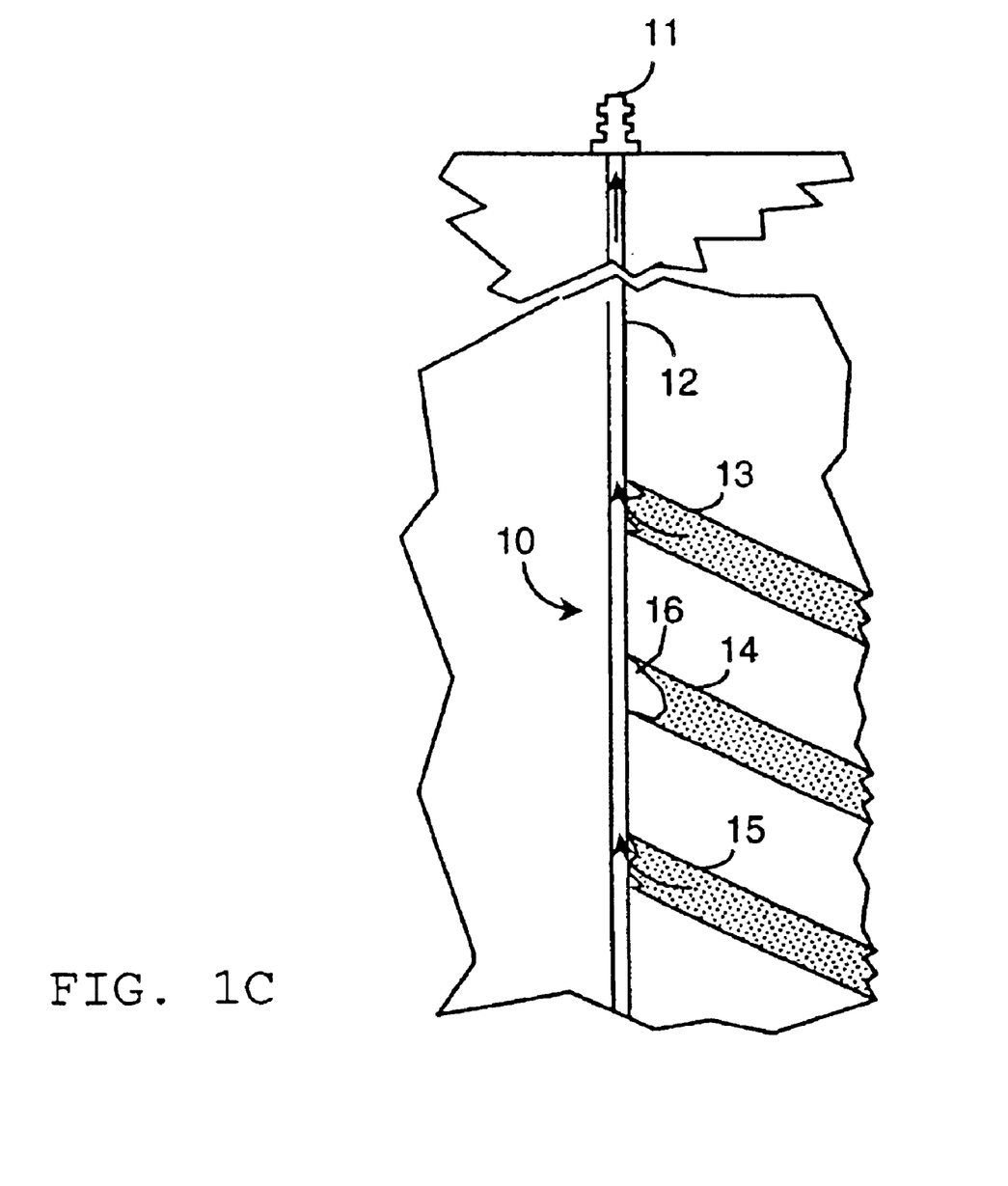

The well is then returned to production. The gel structure is broken by contact with oil and the treatment fluid removed from the oil-producing layers 13 and 15. As the gel structure remains intact in the watered-out zone 14 it is retained in this layer and blocks the flow (FIG. 1C).

Figure 1D:
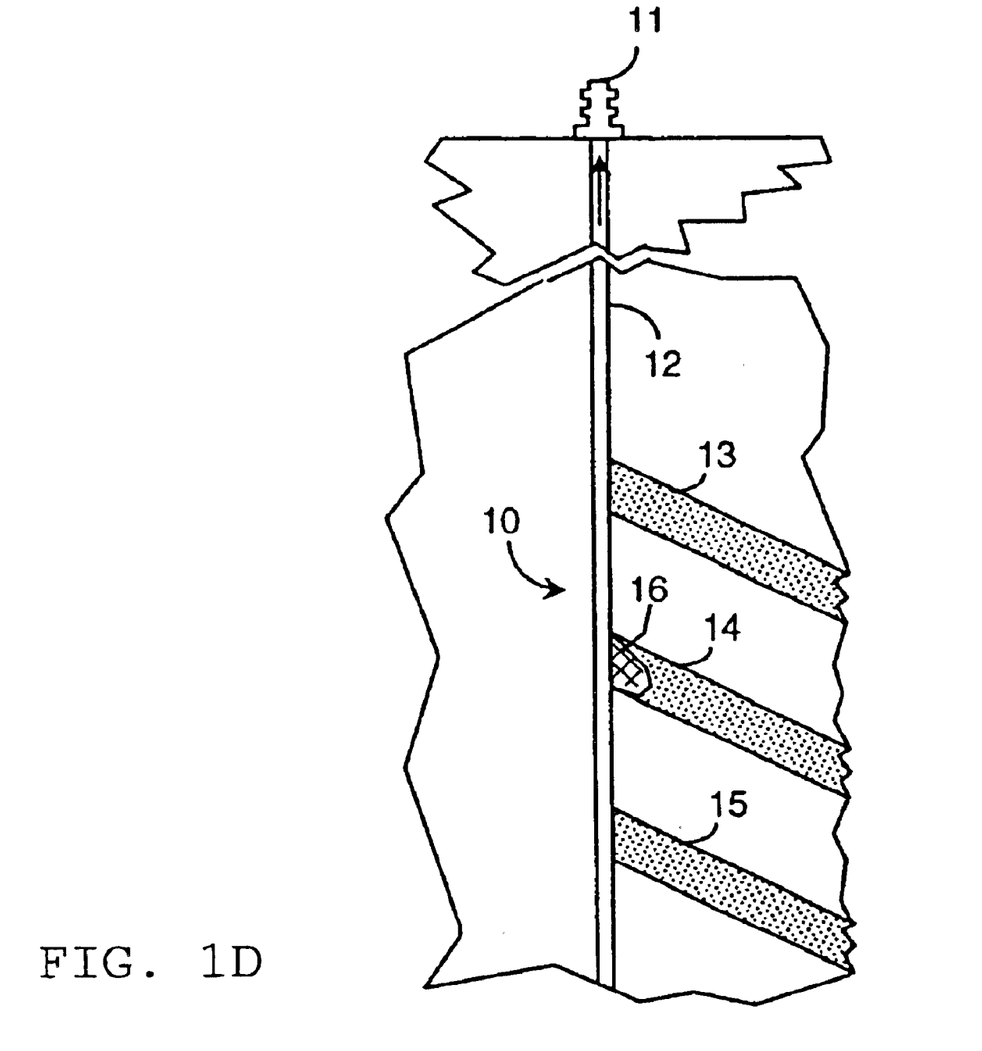

On a longer time scale the treatment fluid 16 forms a strong, robust gel that provides more permanent blockage of the watered out zone (FIG. 1D).

Other problem types where such treatments would provide value are water invasion through fractures or fissures or due to a high water-oil contact in the producing layer.

Figure 2A:
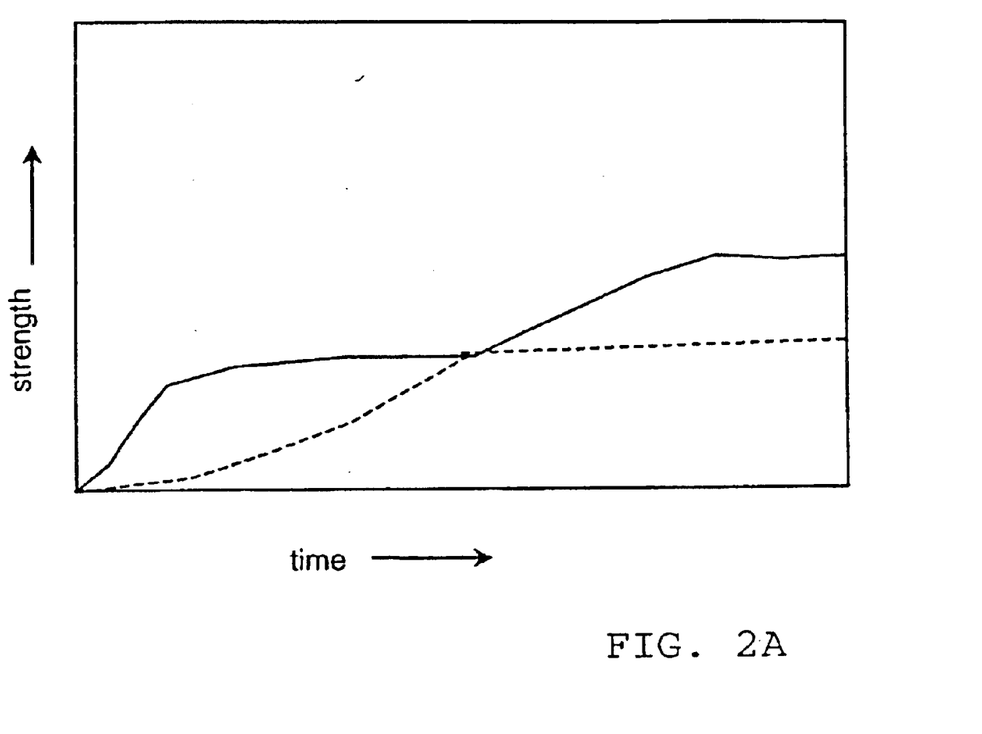
FIGS. 2A–B illustrates the gel strength versus time profile of a composition as used in a water control operation in accordance with the present invention.
Figure 2B:
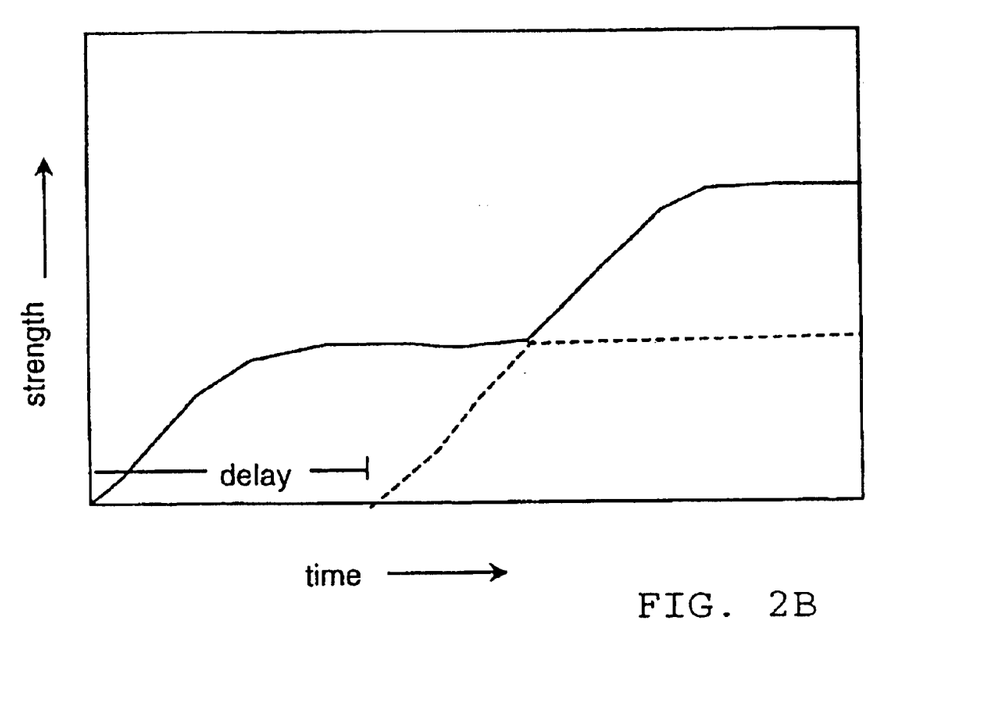

As described above, various chemical compositions can be employed for water control within the scope of the present invention. The gel strength versus time profile of suitable compositions is illustrated by FIGS. 2A and B. Suitable compositions are characterised by a rapid formation of a physically stable structure or gel which is later chemically stabilised by a (slower or delayed) cross-linking reaction. In FIG. 2A, the cross-linking reaction is initiated during injection, however slower than the physical gelation. In FIG. 2B, the cross-linking reaction is delayed. In both figures, the solid line depicts the gel strength of the composition using the commonly applied gel code. The dashed lines illustrate the gel strength development in the absence of either one of the reactions.

A large number of hydrophobically-modified polymers are known as such and suitable for the purpose of the present invention. These polymers are based on the modification of common water-soluble (hydrophilic) polymers such as poly(acrylamide), poly(acrylic acid), poly(vinylpyridine), hydroxyethylcellulose and poly(ethylene oxide). The structure of examples of hydrophobically-modified polymers are given below for poly(sodium 4-styrenesulphonate) (a), poly(vinylpyridine)(b), and poly(acrylamide)(c):

(a)

-continued

(b)

(c)

The fraction M/(M+N) denotes the mole fraction of hydrophobic monomers in the polymer.

The following formulae describe the structure of further examples which can be readily cross-linked using known cross-linkers.

The structure of a hydrophobically-modified poly(acrylamide) where the hydrophobic modification takes the form of replacing about 3 mole percent (M/(M+N)=0.03) of the acrylamide units with the hydrophobic monomer n-nonyl acrylate is:

(d)

This polymer has an average molecular weight of about $5 \times 10^6$ g/mole and it can be readily cross-linked with chromium(III) or zirconium(IV) or the organic cross-linker hexanal. Where the gels formed by conventional poly(acrylamide)/poly(acrylate) copolymers undergo syneresis and shrink, the gels formed by hydrophobically-modified polymers in otherwise identical formulations undergo syneresis at approximately half the rate of the hydrophilic polymers. It is also observed that the cross-linking of the hydrophobically-modified poly(acrylamide) is less sensitive to the concentration of divalent ions ($Ca^{2+}$, $Mg^{2+}$).

The structure of another hydrophobically-modified poly(acrylamide) where the hydrophobic modification takes the form of replacing about 1 mole percent (M/(M+N)=0.01) of the acrylamide units with the hydrophobic monomer N-decylacrylamide is:

(e)

This polymer can also be cross-linked using metal ions (Cr(III), Zr(IV)) and organic molecules (hexanal).

An additional feature of hydrophobically-modified polymers such as (d) and (e) is that they can be prevented from cross-linking in contact with hydrocarbon. The prevention of cross-linking can arise from two possible mechanisms. Firstly, the larger organic cross-linker can be removed from the polymer solution by solubilisation in the contacting hydrocarbon. The cross-linker hexanal, which is solubilized by the hydrophobically-modified polyacrylamide, is readily soluble in hydrocarbon and can be extracted from the polymer solution. Secondly, the solution of hydrophobically-modified polymer can partly solubilize the hydrocarbon which itself can be sufficient to prevent cross-linking. Thus a solution of hydrophobically-modified poly (acrylamide) with the metal ion cross-linker such as Cr(III) or a small water-soluble cross-linker such as formaldehyde can be prevented from cross-linking when mixed with hydrocarbon.

Another embodiment of the invention employs viscoelastic surfactants, preferably delayed system of viscoelastic surfactants. Examples of suitable surfactants and three different methods for delaying the gelation of concentrated surfactant solutions are described below.

Firstly, the gelation process can be delayed by the controlled release of the counter-ion into the surfactant solution. For example, an aqueous solution of the viscoelastic surfactant cetyltrimethylammonium bromide (CTAB);

will immediately form a viscoelastic gel in the presence of the salicylate anion but not with salicylic acid or derivatives of salicylic acid such as an ester or an amide. The salicylate anion can be released from derivatives by acid or alkaline hydrolysis.

An example of the controlled development of viscoelasticity in concentrated surfactant solutions is the release of a counterion for a long-chain quaternary ammonium surfactant. The initial low viscosity fluid consisted of a 30 g/l solution of cetyltrimethylammonium chloride with 20 g/l salicylic acid, 6 g/l urea and 20 g/l sodium chloride. The solution was heated to 60° C., whereupon the urea hydrolyzed and raised the pH which, in turn, released the salicylate anion from the salicylic acid and caused the surfactant solution to gel.

A further variant of the controlled development of the viscoelasticity in a concentrated surfactant solution through the release of a counterion is by hydrolysis of an ester. The example below describes the release of the salicylate anion (or salicylic acid) by the acid or alkaline hydrolysis of a salicylate ester. The rate of hydrolysis (and hence the release of the anion or acid) can be controlled by the pH of the solution and/or the choice of the functional ester group. In the case of acid hydrolysis, raising the pH by the controlled hydrolysis of a second reagent will form the salicylate anion. The surfactant solution consisted of 30 g/l cetyltrimethylammonium chloride with 20 g/l ethyl salicylate, 6 g/l urea and 5 g/l sodium hydroxide. The solution was maintained at 80° C. and the release of the salicylate anion from the salicylate ester caused the surfactant solution to gel.

The second method of controlling the development of viscoelasticity is based on the control of hydrogen bonding between the entangled worm-like micelles. It has been observed that some surfactants such as N-erucyl-N,N-bis(2-hydroxyethyl)-N-methylammonium chloride do not require the presence of a large organic anion such as salicylate to form viscoelastic solutions. At ambient temperature N-erucyl-N,N-bis(2-hydroxyethyl)-N-methylammonium chloride forms a viscoelastic solution when the concentration of a suitable electrolyte is in excess of about 0.5 weight percent.

It is assumed that hydrogen bonding between the —OH groups on the quaternary ammonium groups plays a major role in the binding of the surfactant micelles to form a viscoelastic gel. The presence of hydrogen bonding modifiers should therefore inhibit viscoelasticity in such surfactant systems. It is observed that the addition of hydrogen bonding modifiers such as urea, guanidine hydrochloride and urethane do inhibit viscoelasticity. The additives urea, guanidine hydrochloride and urethane can be broken down by temperature or either base or acid hydrolysis whereupon the viscoelasticity of the surfactant solution can develop. The inhibitor urea can also be broken down using enzymes such as urease to yield ammonia and carbon dioxide; enzymes such as urease can decompose urea very rapidly at ambient temperatures. The use of guanidine hydrochloride may be particularly convenient since in aqueous solution the hydrogen chloride can catalyze the acid hydrolysis of the guanidine.

An surfactant solution to illustrate this variant consists of 30 g/l of the surfactant N-erucyl-N,N-bis(2-hydroxyethyl)-N-methylammonium chloride in an aqueous solution containing 0.5 molar urea, 10 g/l potassium chloride and 40 g/l 3-chloropropionic acid. The presence of the urea in the initial solution significantly weakened the hydrogen bonding between the micelles in the aqueous solution and the surfactant solution could not gel. The urea hydrolyzed rapidly at elevated temperature and its decomposition allowed hydrogen bonding between the surfactant micelles to gel the solution.

The third method of controlling the onset of viscoelasticity in surfactant solutions uses the sensitivity of viscoelastic behavior to the ionic environment of the solution. One method of triggering the gelation of the surfactant solution is by formulating it with a low electrolyte concentration and then subsequently adding electrolyte to achieve the required viscosity. However, the external addition of electrolyte may not always be possible.

A second example of this variant involves the exchange of a salt which inhibits gelation with one which promotes it. Solutions of the surfactant N-erucyl-N,N-bis(2-hydroxyethyl)-N-methylammonium chloride will not gel in the presence of electrolytes containing carbonate, iodide, hydroxide or acetate ions but will form gels in the presence of electrolytes containing chloride, bromide, sulphate and nitrate ions.

Two techniques are proposed for the controlled gelation of surfactant solutions using changes in their ionic environments. Firstly, it is proposed to exchange the anions in the surfactant solution by replacing an anion which inhibits gelation with one which promotes it. The anion exchange can be achieved by flowing the surfactant solution through a pipe or tube, the walls of which consist of an anion exchange membrane; a counter-flow of an electrolyte containing the exchange anion is flowed on the other side of the membrane.

The proposed process could use for example the exchange of iodide for chloride in a solution of a surfactant (e.g., N-erucyl-N,N-bis(2-hydroxyethyl)-N-methylammonium chloride) and the electrolyte sodium iodide. The rate of anion exchange, and hence gelation, can be controlled by the flow rates of the two solutions and the anion diffusion rate through the anion exchange membrane.

Secondly, the anions can be exchanged directly in the surfactant solution by a controlled reaction. For example, chloride ions can be released into solution by the hydrolysis (or other reaction) of a suitable sulphonyl chloride.

Two possible reactions can be given in which chloride ions are released into the surfactant solution replacing anions such as carbonate and hydroxide and causing gelation. One example is the reaction of a sulphonyl chloride with a primary amine and the second example is water or hydroxide ions to release chloride ions into a surfactant solution for the purposes of gelation.

Other examples of surfactants which could be use for the purpose of the present invention include cetylpyridinium chloride or sodium perfluorooctane-1-sulphonate

The use of self-crosslinking polymers to form a gel for use in conformance control can be exemplified in the case of a polymer containing an aldehyde (or alcohol) and a separate polymer containing a phenol.

The chemical reaction between aldehydes and phenols is a well documented process and is the basis for most organic cross-linking of polyacrylamide polymers to form gels. This reaction occurs under basic or acidic conditions and the gels formed are extremely strong and have many uses within the oil industry. The drawbacks to the use of these systems are that phenol is corrosive and causes burns and formaldehyde and other monomeric aldehydes are toxic or at the very least irritants. However, incorporation of these species onto the polymer chain eliminates their toxicity and greatly reduces their irritant properties, hence making for safer systems which are easier to handle.

A first example of a self cross-linking water-soluble polymer which consists of the monomer units acrylamide, acrolein and 4-vinylphenol according to the following structural formula formed by the copolymerisation of the monomers acrylamide (mole fraction $X \leq 0.94$), acrolein (mole fraction $Y \leq 0.03$) and 4-vinylphenol (mole fraction $Z \leq 0.03$).

The condensation reaction between the phenol and the aldehyde still proceeds in a controlled manner to form the cross-linked gel and hence generate the desired water blocking system without the problems associated with the conventional systems which use separate (monomeric) cross-linking agents. An additional benefit of a self cross-linking polymer is that the cross-linking process is closely controlled and no screening out of the cross-linker or problems with mixing can occur.

The employment of two or more different polymer types containing different functionality allows for the gel time, gel strength and stability of the system to be controlled by varying the composition of the mixtures used as factors such as secondary cross-linking can be used advantageously.

The following example employs two polymeric systems. System A is a copolymer of acrylamide (mole fraction $X \leq 0.97$) and acrolein (mole fraction $Y \leq 0.03$) in accordance with the following structural formula

The second system (system B) is a copolymer of acrylamide (mole fraction $X \leq 0.97$) and 4-vinylphenol (mole fraction $Z \leq 0.03$) according to:

The use of system A alone will produce a gel suitable for lower temperature systems but the use of a mixture of the two polymers will result in a cross-linked gel of much higher stability for deployment in harsher climates.

Two examples of a two-stage gelation process in an aqueous solution containing a viscoelastic surfactant and a high molecular weight cross-linkable polymer are described below in further detail.

Example 1 consists of a solution of 30 g/l of the surfactant N-erucyl-N,N-bis(2-hydroxyethyl)-N-methylammonium chloride (A)

and 7 g/l of the hydrophobically-modified polymer poly (acrylamide) of molecular weight 2×10' g/mole with 3 mole percent of the hydrophobe n-nonyl acrylate in a solution of 0.5 molar sodium chloride. The development of the viscoelasticity of the surfactant is delayed by the addition of urea phosphate (0.5 molar) and the hydrophobically-modified poly(acrylamide) is cross-linked by the addition of 1 g/l acetaldehyde.

The development of the gel strength code of the polymer/surfactant solution as a function of time was monitored at a temperature of 60° C. The solution had a low initial viscosity as the development of the surfactant gel had been delayed by the presence of urea phosphate. As the urea phosphate broke down in the solution, the surfactant began to gel and the gel strength code increased to reach a value of 3.5 after about 18 hours. The gel strength of the solution continued to increase as the poly(acrylamide) cross-linked to form a chemical gel and after 60 hours the gel strength had reached a value of almost 6. Between the about 18 and 24 hours the solution remained at the limiting gel strength of the surfactant solution alone. For comparison A similar polymer/surfactant solution without the addition of the acetaldehyde cross-linker reached only gel strength 3.5 after 60 hours at 60° C. as the limiting gel strength of the viscoelastic surfactant solution.

The polymers used in these sequential surfactant and polymer gels can be any suitable high molecular weight water-soluble polymer which can be chemically cross-linked. Common water-soluble polymers include poly(acrylamide), poly(vinyl alcohol), poly(vinylpyrrolidone)/poly(2-acrylamido-2-methyl-1-propanesulphonic acid) copolymer and hydrophobically-modified polymers such as the hydrophobically-modified poly(acrylamide) used herein. The cross-linking of hydrophobically-modified polymers is described below.

The second example consists of the surfactant N-erucyl-N,N-bis(2-hydroxyethyl)-N-methylammonium chloride (15 g/l) and the hydrophobically-modified poly(acrylamide), as used in the previous example, in an aqueous solution of 0.5 molar urea phosphate and 0.5 molar sodium chloride. The chemical cross-linker for the hydrophobically-modified poly(acrylamide) was principally acetaldehyde which was produced in situ by the hydrolysis of the 2-chloroethanol added to the solution. Again the dependence of the gel strength of the solution as a function of time was monitored but at 90° C. Between 16 and 24 hours the solution reached a limiting gel strength code of about 3 which was the limiting value for the viscoelastic surfactant solution.

After about 60 hours the solution had reached a limiting gel strength of 5 which corresponded to a rigid chemical gel. For comparison the development of gel strength in the hydrophobically-modified poly(acrylamide) solution was monitored in the absence of the surfactant. It is clear that at early time (at a time less than about 20 hours) the gel strength of the surfactant-polymer solution is dominated by the presence of the surfactant; only after a time of about 50 hours can increases in the gel strength of the solution be attributed to the chemical cross-linking of the polymer. It should also be noted that the gelation of the viscoelastic surfactant has been delayed by the addition of the urea phosphate. In the absence of the urea phosphate the surfactant gel would form immediately on mixing and the gel strength code would be 2.5–5.0.

In another example, a solution containing poly(acrylamide) (7 g/l), N-erucyl-N,N-bis(2-hydroxyethyl)-N-methylammonium chloride (1.5%), Urea phosphate (0.5 molar), Brine (0.5 molar) and 2-chloroethanol (1%) was prepared and heated to 60° C. for 12 h and a code 3 physical gel that was oil sensitive was formed. Further heating at 90° C. for 48 hours formed a code 5 chemical gel with no oil sensitivity. Similar results were observed replacing in the above solution the poly(acrylamide) by hydrophobically-modified poly(acrylamide).

In the following, three examples are described for gelling compositions containing surfactants which form micelles. The surfactants are then stabilized by a polymerization agent, thus permanently stabilizing the gel. The stability of the gel can be further enhanced by a cross-linking reaction between the polymerized surfactant. The polymerization in the three examples is achieved by a free radical mechanism. However, it is stressed that the polymerization of the surfactant monomers to form polymeric surfactants can be achieved by a number of well known methods, including ring-opening polymerization, cation polymerization and anionic polymerization techniques. A description of these and other polymerization techniques has been given by G. Odian in: "Principles of Polymerization", 3rd ed., pp., Wiley, New York (1991).

The first example is the polymerization of the surfactant N-erucyl-N,N-bis(2-hydroxyethyl)-N-methylammonium chloride (as shown above) in an aqueous solution. The polymerization of the surfactant molecules is achieved by joining the carbon—carbon double bonds by a free radical polymerization reaction within the micelles using the following processes.

A viscoelastic surfactant solution was produced using 30 g/l of the surfactant N-erucyl-N,N-bis(2-hydroxyethyl)-N-methylammonium chloride with 40 g/l ammonium chloride. A volume of 100 ml of the viscoelastic surfactant solution was placed in a bottle which was purged with dry nitrogen gas to remove any dissolved oxygen. After sufficient purging 10 mg of the free radical initiator 2,2'-azo(bis-amidinopropane)dihydrochloride was added to the viscoelastic surfactant solution and mixed thoroughly. The surfactant solution was heated at 60° C. for 24 hours under an atmosphere of nitrogen. Polymerization of the surfactant monomers in the giant micelles resulted in the viscosity of the gel becoming insensitive to contact with hydrocarbon. The viscosity of the surfactant gel was not altered by polymerization of the surfactant monomers. The polymerized surfactant gel retained its gel strength after prolonged contact with water.

The second example is the polymerization of the viscoelastic surfactant solution formed by potassium oleate in a potassium chloride electrolyte solution:

The viscoelastic surfactant solution was formed by mixing 60 g/l potassium oleate with 60 g/l potassium chloride. A sample of 100 ml of the viscoelastic surfactant solution was purged with nitrogen and mixed with 10 mg of the initiator 2,2'-azo(bisamidinopropane)dihydrochloride. The solution was heated at 60° C. for 24 hours under an atmosphere of nitrogen. The resulting solution of polymerized surfactants was slightly less viscoelastic than the original monomeric solution but the observed viscoelasticity was insensitive to contact with hydrocarbon. The gel formed by the polymerized surfactant retained its viscoelasticity after prolonged contact with water.

The third example is the polymerization of a long-chain vinyl surfactant, the potassium salt of 10,17-octadecyldienoic acid in a viscoelastic solution. The surfactant monomer is synthesized by a two stage reaction which involves coupling of the short-chain vinyl surfactant 10-undecenoic acid to 8-bromo-1-octene. The first stage consists of reacting the 10-undecenoic acid with ozone in dichloromethane followed by treatment with dimethyl sulphide (DMS) at −78° C. to convert the carbon—carbon double bond to a terminal aldehyde group by the so-called oxo-uncoupling reaction. The second stage consists of reacting the 8-bromo-1-octene with triphenylphosphine in dichloromethane to form 8-triphenylphosphonium-1-octene bromide which is then coupled with the aldehyde carboxylic acid and butyllithium in tetrahydrofuran by the Wittig reaction to form the surfactant monomer as shown above.

The potassium salt of 10,17-octadecyldienoic acid forms a viscoelastic surfactant solution at a concentration of 60 g/l in the presence of 40 g/l ammonium chloride. The surfactant monomers were polymerized using 10 mg of the free radical initiator 2,2'-azo(bis-amidinopropane)dihydrochloride in 100 ml of viscoelastic surfactant solution which had been purged with nitrogen gas. The solution was heated at 60° C. for 24 hours under an atmosphere of nitrogen.

Polymerization of the surfactant resulted in a rigid gel which retained the viscoelasticity of the original (monomeric) surfactant solution but showed none of its sensitivity to contact with hydrocarbon or water.

In all three of the examples given above it is possible to cross-link the polymeric micelles to increase the gel strength and to reduce further any sensitivity of the gel to its chemical and physical environment. The carboxylated polymers shown in the three above examples can be cross-linked using a polyvalent metal ion, such as chromium(III) or zirconium (IV) ions. Similarly, if the terminal carboxylate groups are replaced by sulphonate groups, then the polymerized micelles can also be cross-linked with metal ions such as zirconium(IV). Alternatively, the original viscoelastic surfactant solution can be composed of two different types of surfactant monomer which form mixed cylindrical micelles. The second surfactant monomer can be chosen to give a required cross-linking functionality to the polymerized micelle. For example, a viscoelastic surfactant solution can be formed with 10,17-octadecyldienoic acid and its amide 10,17-octadecyldienamide added in the mole fraction ratio of approximately 0.98:0.02. The two surfactants can be polymerized, as in example 3 given above, to yield a co-polymerized micelle. The amide groups within the polymerized micelles can be used to cross-link them with organic cross-linking agents such as formaldehyde and phenol. The high concentration of surfactant in the aqueous solution can be used to solubilise otherwise insoluble long-chain cross-linking agents such as hexanal or octanal. Other cross-linking functional groups can be envisaged.

What is claimed is:

1. A method comprising the steps of pumping a chemical composition into a production interval and into surrounding formation; said composition being capable of forming, firstly, a physically stabilized structure and, secondly, a chemically stabilized structure, wherein said physically stabilized structure being dissolvable by hydrocarbon containing fluids; letting said composition form said physically stabilized structure within the formation surrounding said production interval; changing pressure condition in said production interval such that the fluid flow within the surrounding formation is reversed; letting thereby in some portions of the formation hydrocarbon containing fluids dissolve said physically stabilized structure and chemically stabilize said structure in the remaining portions by a cross-linking reaction.

2. The method of claim 1, wherein the time required to form the physically stabilized structure after injection is significantly shorter than the time required to form a chemically stabilized structure.

3. The method of claim 1, wherein the time required to form the physically stabilized structure is less than 24 hours after injection.

4. The method of claim 1, wherein the time required to form the chemically stabilized structure is more than 24 hours after injection.

5. The method of claim 1, wherein the composition comprises hydrophobically modified water-soluble polymers, surfactants, viscoelastic surfactants, or mixtures thereof.

6. The method of claim 1 wherein the physically stabilized structure is stabilized by van der Waals forces acting between molecules of the composition.

7. The method of claim 1 wherein the physically stabilized structure is a gel.

8. The method of claim 1 wherein the method is applied directly from the surface as a bull-headed formation treatment applied indiscriminately to a production interval.

* * * * *